United States Patent [19]

Grund

[11] Patent Number: 4,908,956
[45] Date of Patent: Mar. 20, 1990

[54] POWER CONTROLLER FOR HEATER LOAD

[75] Inventor: J. Evan Grund, San Jose, Calif.

[73] Assignee: Impact Systems, Inc., San Jose, Calif.

[21] Appl. No.: 329,626

[22] Filed: Mar. 28, 1989

[51] Int. Cl.$^4$ .............................................. F26B 19/00
[52] U.S. Cl. ............................................. 34/48; 34/41
[58] Field of Search ..................... 34/1, 41, 4, 68, 43, 34/48, 53

[56] References Cited

U.S. PATENT DOCUMENTS

4,188,731 2/1980 Rauskolb .

Primary Examiner—Henry A. Bennet
Attorney, Agent, or Firm—Flehr, Hohbach, Test, Albritton & Herbert

[57] ABSTRACT

A power control system for the heat lamps for typically drying a continuous web of paper in order to provide a linear moisture profile locates the actuating thyristor type switch at each zone where the heater lamps themselves are located. Thus, computer control can be centralized and wiring minimized. The parameters of minimum flicker for unity power factor and high resolution power control are achieved by utilizing the timing signals provided by the zero crossings of the three-phase AC line voltage input and controlling either half cycles or partial half cycles for each zone. Computing time is reduced by providing for scratch pad memory tables which can rapidly be scanned or sequenced through by a zone pointer.

12 Claims, 5 Drawing Sheets

FIG.-4D  20% (START UP)

POWER CONTROLLER FOR HEATER LOAD

BACKGROUND OF THE INVENTION

The present invention is directed to a power controller for a heater load and more specifically to a heater for drying moving sheet material such as paper.

DESCRIPTION OF PRIOR ART

Radiant heaters having quartz heating elements located in the cross-direction of a moving web of paper, for example, which may be individually controlled to provide an even moisture profile, are disclosed in U.S. Pat. No. 4,494,316 assigned to the present assignee. Such heaters consist of modules with individual electric infrared heating elements located along the cross-direction of the moving sheet material with a particular group of heating elements, for example, one to three, being associated with the particular zone or slice of the moving sheet material. A cross-direction moisture sensor by means of a moisture controller then feeds back necessary control information to the heaters to control them to an appropriate power level to provide an even moisture profile.

The control of such power is illustrated in a copending application entitled "Digital Heat Lamp Control System" by David Wolze, Ser. No. 145,526 filed Jan. 19, 1988, and now U.S. Pat. No. 4,859,926 and assigned to the present assignee. This technique uses silicon controlled rectifiers or gate turn-off thyristors whose firing angle is controlled to regulate the fraction of an AC half cycle which is applied to the heat lamp. While the above system very aptly provides a high resolution control, in some installations it is desired to improve power factor or provide for a reasonable resolution, but all with economical associated hardware.

OBJECTS AND SUMMARY OF THE INVENTION

It is therefore a general object of the present invention to provide an improved power control system for heater loads.

In accordance with the above object, there is provided a power control system with a three-phase AC line input for drying a moving web in response to a moisture controller where a plurality of side-by-side heat lamps are suspended over the web in a cross direction, each lamp or group of lamps relating to a particular zone or slice of the web. The system comprises a power circuit extending across the web with each zone tabbed off in parallel to power the heat lamps for each zone, including individual switching means for each zone located substantially at the zone for controlling the application of power to the heat lamps. Processing means responsive to the moisture controller and the zero crossings of the three-phase AC line input actuate the switches for controlling half cycles or partial half cycles of the three-phase AC line input to the required power level as determined by said moisture controller.

An associated method is also provided.

DESCRIPTION OF PREFERRED EMBODIMENTS

Figure 1:
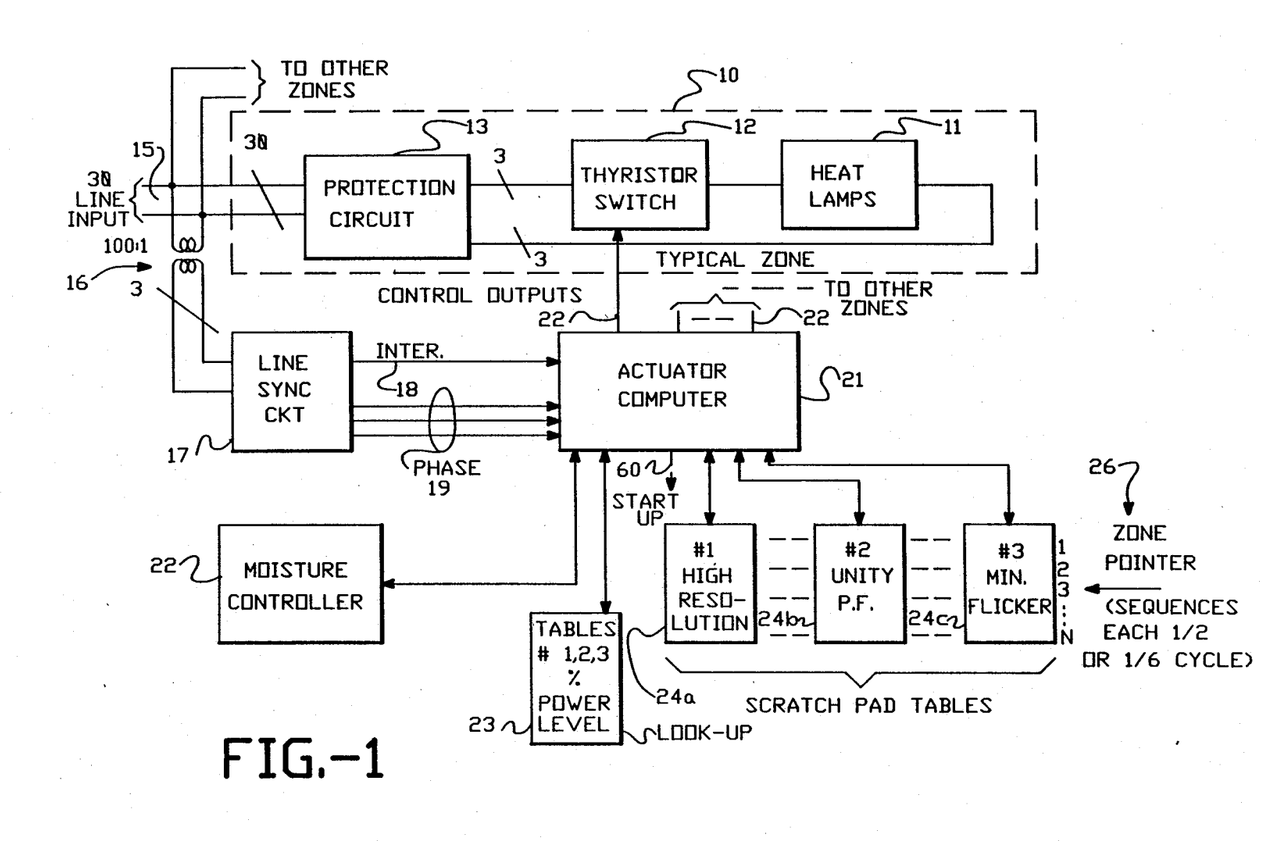
FIG. 1 is a block diagram embodying the present invention.

FIG. 1 illustrates the equipment for drying a particular zone or slice of a moving paper sheet as shown within the dashed box 10. This includes quartz-halogen infrared heat lamps 11 suspended over that particular zone, associated thyristor switch or switches 12 and a protection section 13 which is driven by a three-phase line input 15. This line extends to other zones (which may number as many as 150 and in reality typically might be 3" widths of a moving paper sheet being manufactured by a papermaking machine).

Figure 2:
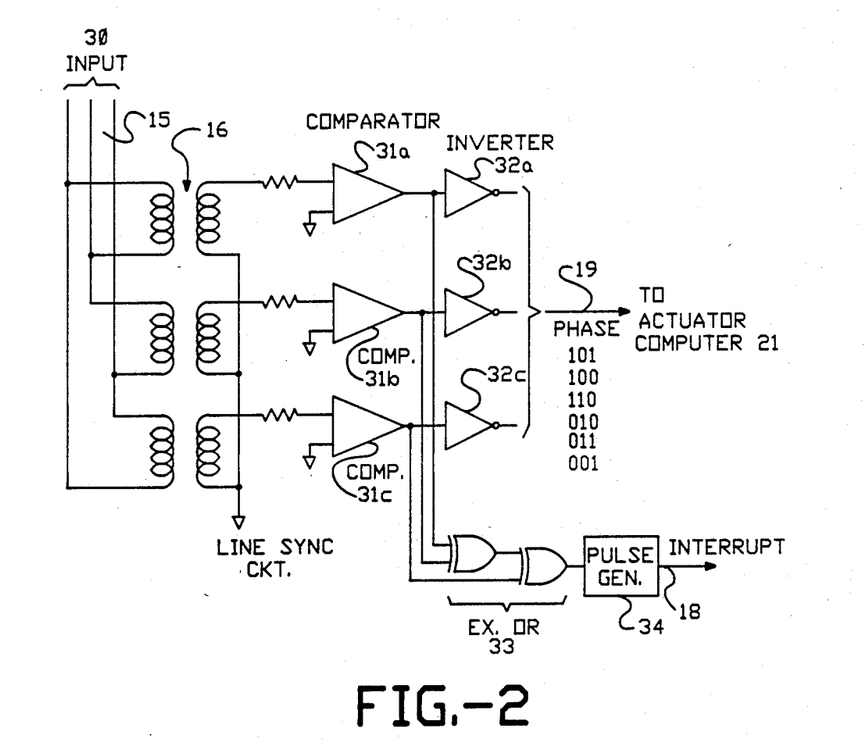
FIG. 2 is a more detailed circuit schematic of a portion of FIG. 1.

In a central control location for all of the zones, information as to the three-phase input 15 is tapped off via the instrumentation transformer 16 which, for example, may have 100:1 ratio and this three-phase input is fed into a line sync of circuit 17. Such circuit as will be discussed in conjunction with FIG. 2 provides an interrupt output 18 at every zero crossing of the three-phase waveforms and phase information by the three lines 19. All of this information is received by an actuator computer 21 which, by means of its control output lines 22, drives the thyristor switches 12 in each zone. And since each zone may have a different power level required of its associated heat lamps, these are individual control lines.

Actuator computer 21 is coupled to a moisture controller 22 which receives information from a standard cross-direction moisture sensor and effectively determines the percentage power level to be applied to the heat lamps of each zone. This is done as will be discussed in detail below by the use of lookup tables 1, 2, and 3 illustrated at 23 which contain information or data to provide the percentage of power level. The moisture controller, by means of control information calculates the desired power level for each zone and transfers that information to the actuator computer 21. The actuator computer then looks up the proper percent power level in one of the tables 23 and transfers this information for that particular zone to one of the three scratch pad tables 24a, 24b and 24c.

As indicated, these tables are related to tables 1, 2 and 3 except that they are ordered by particular zones and are addressed by the zone pointer indicated at 26 which effectively sequences through each zone to retrieve the power level data for that particular zone at a rate that is required by the switching rate of the thyristor switch 12. As will be discussed below, this is either one-half cycle (assuming a 60 Hertz input) or one-sixth of a cycle. Thus, the zones are indicated as 1, 2, 3 ... N and as discussed above, may be as many as 150. Typically, only one type of power level table would be utilized for its particular desired parameter and the resultant scratch pad table 24 would reflect this parameter. These are in Table No. 1 "Minimum Flicker", Table No. 2 "Unity Power Factor" or Table No. 3 "High Resolution".

Since the computer 21 must both form the table by use of moisture controller 22 and the lookup tables 23 and then on an on line basis, retrieve data from a particular zone scratch pad table to actuate the thyristor switches in sequence. Of course this is done at such a rapid rate that it is more or less transparent to the relatively slow cycling rate of the 60 cycle AC and switches 12.

Thus, from an overall point of view, because of the above arrangement, only a single processing means need be used for controlling all of the various zones which all theoretically require different power levels at the same time. As is well known, one of the main objects of the drying process is to eliminate moisture streaks in the paper being manufactured so that a uniform moisture profile is provided.

Figure 1A:
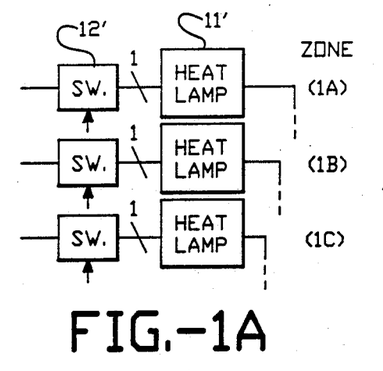
FIG. 1A is a modification of a portion of FIG. 1.
Figure 1B:
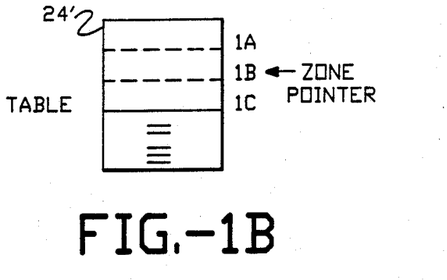
FIG. 1B is a diagram of a scratch pad table which is a modification of a table of FIG. 1.

FIGS. 1A and 1B illustrate an alternative which can be utilized to reduce flicker. In effect, the zones are subdivided as illustrated in FIG. 1A for a typical zone as subzones 1A, 1B, and 1C and where the individual heat lamps of the zone are individually controlled by their respective switches designated 12' with the heat lamps being designated 11'. Thus, as illustrated in FIG. 1B, the scratch pad table designated 24' of whatever type would have subdivided zones 1A, 1B, 1C corresponding to the switches 12' to be activated.

Figure 3:
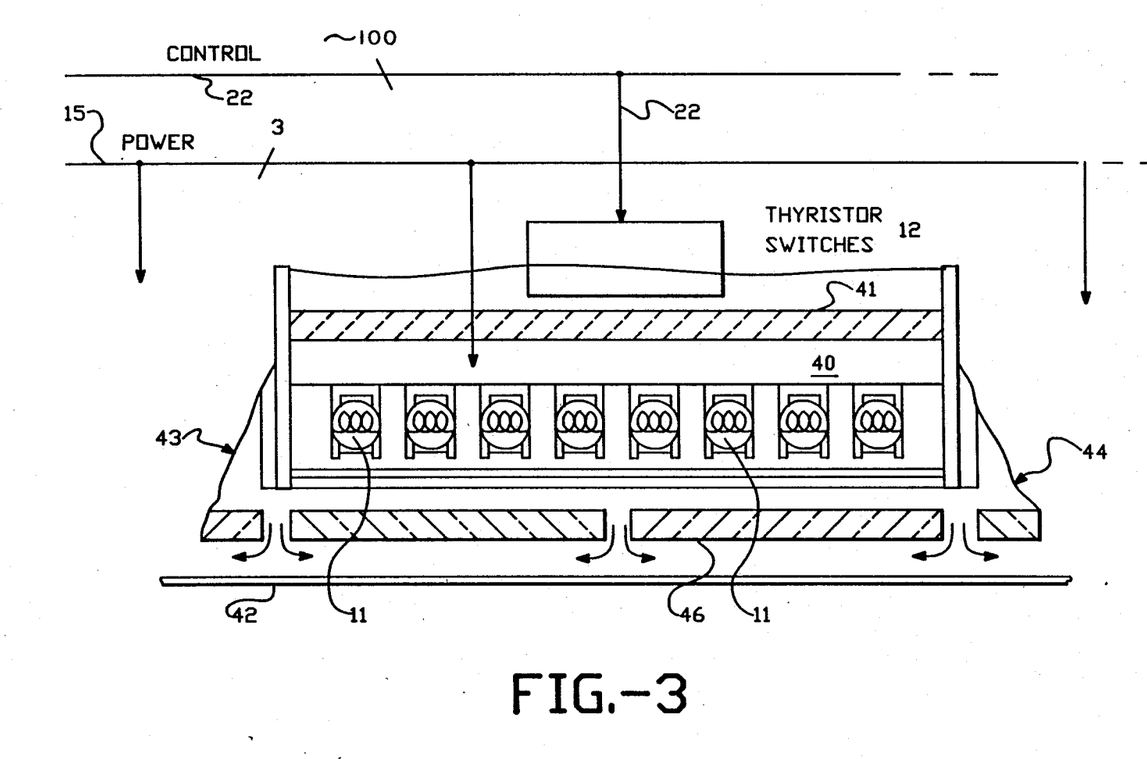
FIG. 3 is a cross-sectional view of heat lamps as actually used in the present invention.

In order to provide an effective switching for the thyristor switches 12 at either half cycle intervals or one-sixth cycle internals, the line sync circuit of FIG. 2 provides for switching information six times in a cycle. This is accomplished by utilizing the three-phase line input 15, passing it through the instrumentation transformers 16. And then by use of the output of comparators 31a through 31c through the Exclusive or gate 33 and the pulse generator 34 the interrupt 18 is provided. This interrupt in essence provides for the sequencing of the zone pointer 26. Inverters 32a–32c provide on line 19 associated phase information, as shown by the binary tables.

flow. Details of such modules are shown in U.S. Pat. No. 4,494,316 assigned to the present assignee and entered under the name of Erik Stephansen. The connection of the power line to the heat lamps is typically accomplished in a wye or delta connection.

Figures 4, 4A:
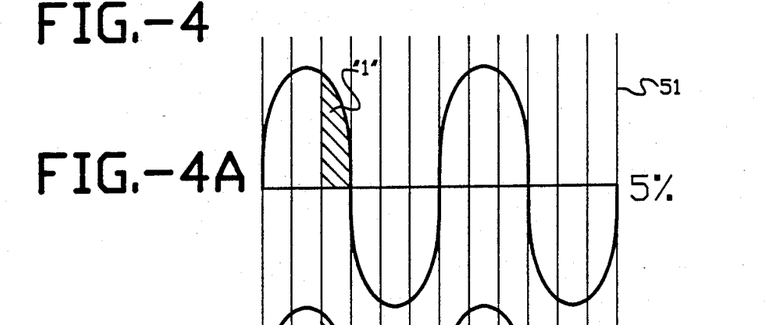
FIGS. 4A through 4D are waveforms useful in understanding the invention.
Figure 4B:
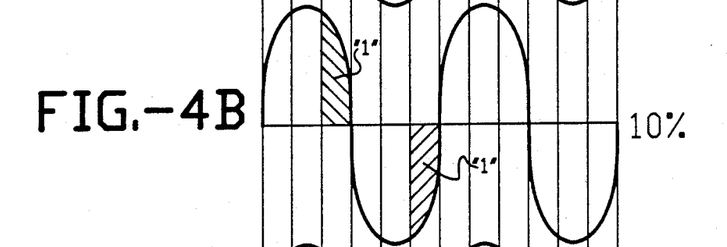
Figure 4C:
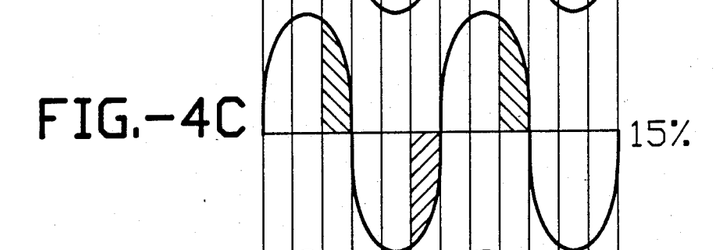
Figure 4D:
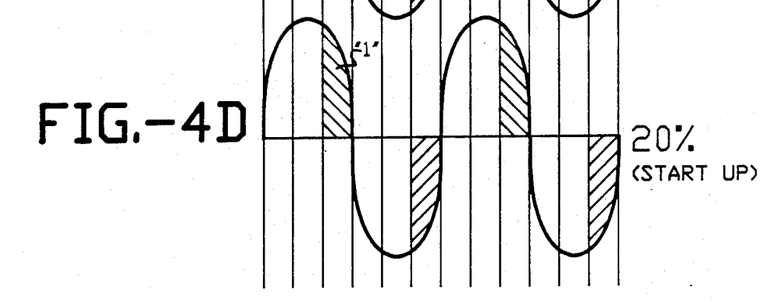
Figures 5, 5A:
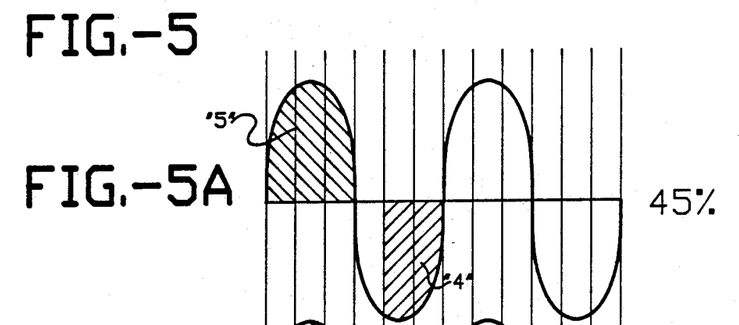
FIGS. 5A through 5D are additional waveforms useful in understanding the invention.
Figure 5B:
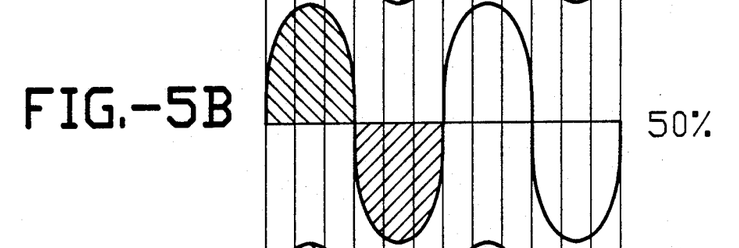
Figure 5C:
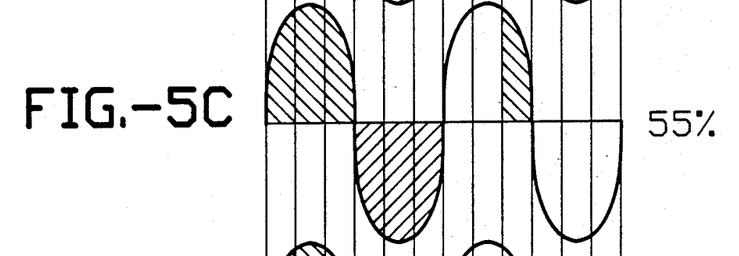
Figure 5D:
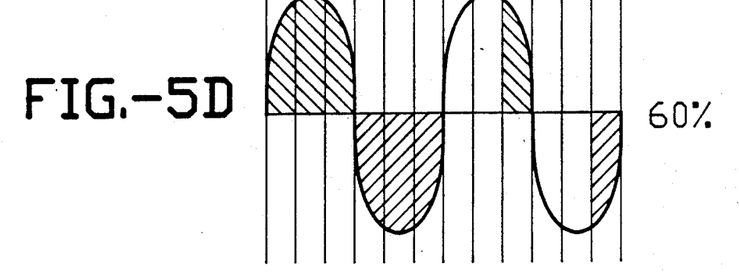

The switching of the heat lamps to provide for minimum flicker is graphically illustrated in FIGS. 4 and 5 where the associated percentage legends relate to applied power level. The cross-hatched portions of the illustrated sine waves illustrate a closed or on condition of the heat lamp. Thus, the greater portion of the sine wave, which is cross-hatched, the greater the indicated power level. Referring specifically to FIG. 4A, the vertical lines 51 which occur every 60°—thus, every one-sixth of a cycle—are in effect the interrupt times on line 18 driving the actuator computer 21 (see FIG. 1). These provide the timing for switch actuations and in accordance with standard thyristor switch theory, after the switch is turned on, a zero crossing will turn it off.

One-third of a half cycle, as shown in FIG. 4A, is provided by the cross-hatched portion designated "1"; two-thirds of a half cycle are shown by the cross-hatched portion "4" in FIG. 5A, and the full half cycle by the cross-hatched portion "5". Thus, as is apparent from FIGS. 4 and 5, by control of the partial or full half cycles, the power level can be regulated.

Of course, a silicon controlled rectifier, if controlled by a proper processing means, can provide an unlimited selection of partial half cycles. However, this requires large computing power (raising costs considerably) and in addition, many times affects the parameters such as flicker and power factor adversely.

Specifically, as illustrated in FIGS. 4 and 5, to minimize flicker the technique is to substantially identically repeat the waveforms so illustrated every two cycles. The following Table 1 indicates this:

TABLE 1

| MINIMUM FLICKER | | | | | |
|---|---|---|---|---|---|
| | | REPEAT → | HALF CYCLES | | |
| POWER LEVEL | 1 2 3 4 | 5 6 7 8 | 9 10 11 12 | 13 14 15 16 | 17 18 19 20 |
| 10% | 1 1 0 0 | 1 1 0 0 | 1 1 0 0 | 1 1 0 0 | 1 1 0 0 |
| 15% | 1 1 1 0 | 1 1 1 0 | 1 1 1 0 | 1 1 1 0 | 1 1 1 0 |
| 20% | 1 1 1 1 | 1 1 1 1 | 1 1 1 1 | 1 1 1 1 | 1 1 1 1 |
| | | | — | | |
| | | | — | | |
| 45% | 5 4 0 0 | 5 4 0 0 | 5 4 0 0 | 5 4 0 0 | 5 4 0 0 |
| 50% | 5 5 0 0 | 5 5 0 0 | 5 5 0 0 | 5 5 0 0 | 5 5 0 0 |
| | | | — | | |
| 100% | 5 5 5 5 | 5 5 5 5 | 5 5 5 5 | 5 4 5 5 | 5 5 5 5 |

FIG. 3 physically shows eight heat lamps 11 which are part of a heater module 40 which typically might serve two zones. Twelve might also be used. They are divided in two groups of 4 or 6 for switching purposes. The thyristor switches 12 are an integral part of this module 40 being mounted as shown on the insulating barrier 41. Such a module 40 is arranged in a cross-direction to the moving paper sheet 42 and is in a line of side-by-side modules, including, as partially indicated, the module 43 on the left side and the module 44 on the right side. Glass barriers 46 protect the paper from the modules and are provided with slits for appropriate air Referring to the above table, twenty half cycles are listed, along with the power levels of 10, 15, 45, 50 and 100%. For example, referring to the power level of 10%, the waveform of FIG. 4B applies and here two "1" level switch closures are made. And referring to Table 1, these are continuously repeated for the remainder of the power on period. And then referring to FIG. 5A, this is the 45% power level and Table 1 reflects the full on or "5" level for the first half cycle and then the two-thirds on or "4" level for the negative half cycle.

Lastly, as indicated in Table 1, 100% is of course the sine wave fully on.

The foregoing prevents flicker since the observable flicker frequency has a period of greater than 1/20 second. With the repeating of data every two cycles with the 60 cycle system the repetition rate is 1/30 second or for a 50 cycle system 1/25 second. Thus, flicker is substantially eliminated.

At the same time, besides minimizing flicker, by appropriate entry into the half cycle table by a starting pointer (1 through 20 of Table 1) for each adjacent zone the balance between positive and negative half cycles can be maintained and also a power factor improved. However, these are secondary qualifications. One sacrifice which is made is that only a 5% resolution is provided. The use of a starting pointer at different points in the twenty half cycles listed is illustrated by the below Table 2, which is for the provision of unity power factor.

at half cycle 10 and so on. As stated above, this improves balance and is the main reason for the pointer technique. By having zones alternate between odd and even starting points, if all zones are set to the same level, a perfect balance between positive and negative half cycles will result; and, of course, an improved balance occurs even with different levels.

Referring to the unity power factor Table 2 itself, here to provide unity power factor a full one-half cycle regulation is used and not partial one-half cycles. Thus, this inherently provides the improved power factor. The 10% power level, as shown in the table, utilizes a full one-half cycle at half cycle 1 and then a full half cycle at half cycle 12. Thus, the power is on 2/20 or a 10% level. 15%, 20%, 45% and 50% levels are also shown in the table. Intuitively the 50% level shows every other cycle being fully on or the switch being actuated. The remainder of the table of course is intuitively obvious. And the half cycle pointer is adjusted to

TABLE 2

| POWER LEVEL | UNITY POWER FACTOR — HALF CYCLES | | | | | | | | | | | | | | | | | | | |
|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 |
| 10% | 5 | 0 | — | — | — | — | — | — | — | — | 0 | 5 | 0 | — | — | — | — | — | — | 0 |
| 15% | 5 | 0 | — | — | — | 0 | 5 | 0 | — | — | — | 0 | 5 | 0 | — | — | — | — | — | 0 |
| 20% | 5 | 0 | — | — | — | 0 | 5 | 0 | — | 0 | 5 | — | — | — | 0 | 5 | 0 | — | — | 0 |
| 45% | 5 | 0 | 5 | 0 | 5 | 0 | 5 | 0 | 0 | 5 | 0 | 5 | 0 | 5 | 0 | 5 | 0 | 0 | 5 | 0 |
| 50% | 5 | 5 | 0 | 0 | 5 | 5 | 0 | 0 | 5 | 5 | 0 | 0 | 5 | 5 | 0 | 0 | 5 | 5 | 0 | 0 |

| ZONE | HALF CYCLE POINTER |
|---|---|
| 1 | 1 |
| 2 | 10 |
| 3 | 1 |
| 4 | 10 |
| — | — |
| — | — |
| — | — |
| 10 | 11 |
| 11 | 2 |

Before referring to the main part of the table, the portion relating zone to the half cycle pointer shows how with zone 1 the pointer starts at the first cycle of the 20 cycles (and this applies to Table 3, also), zone 2 provide for a good balance.

Finally, Table 3 provides for a maximization of resolution to 1%; but of course that sacrifices flicker and power factor in doing so.

TABLE 3

| POWER LEVEL | 3% RESOLUTION — HALF CYCLES | | | | | | | | | | | | | | | | | | | |
|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 |
| 10% | 1 | 1 | 0 | 0 | 1 | 1 | 0 | 0 | 1 | 1 | 0 | 0 | 1 | 1 | 0 | 0 | 1 | 1 | 0 | 0 |
| 11% | 1 | 1 | 1 | 0 | 1 | 1 | 0 | 0 | 1 | 1 | 0 | 0 | 1 | 1 | 0 | 0 | 1 | 1 | 0 | 0 |
| 12% | 1 | 1 | 1 | 0 | 1 | 1 | 0 | 0 | 1 | 1 | 0 | 1 | 1 | 1 | 0 | 0 | 1 | 1 | 0 | 0 |
| 1 | 1 | 1 | 1 | 1 | 1 | 1 | 1 | 1 | 1 | 1 | 1 | 1 | 1 | 1 | 1 | 1 | 1 | 1 | 1 | 1 |
| 25% | 4 | 0 | 0 | 1 | 0 | 4 | 0 | 1 | 4 | 0 | 0 | 1 | 0 | 4 | 0 | 1 | 4 | 0 | 0 | 1 |
| 50% | 5 | 5 | 0 | 0 | 5 | 5 | 0 | 0 | 5 | 5 | 0 | 0 | 5 | 5 | 0 | 0 | 5 | 5 | 0 | 0 |

REDUCE FLICKER (e.g. for 12%)     ZONE

| | 1 | 2 | 3 | 4 | 5 | 6 | 7 | 8 | 9 | 10 | 11 | 12 | 13 | 14 | 15 | 16 | 17 | 18 | 19 | 20 | |
|---|---|---|---|---|---|---|---|---|---|---|---|---|---|---|---|---|---|---|---|---|---|
| offset 0 | 1 | 1 | 1 | 0 | 1 | 1 | 0 | 0 | 1 | 1 | 0 | 1 | 1 | 1 | 0 | 0 | 1 | 1 | 0 | 0 | 1A |

TABLE 3-continued

| | 3% RESOLUTION | | | | | | | | | | | | | | | | | | | |
|---|---|---|---|---|---|---|---|---|---|---|---|---|---|---|---|---|---|---|---|---|
| offset 7 | 0 | 0 | 1 | 1 | 0 | 1 | 1 | 1 | 0 | 0 | 1 | 1 | 0 | 0 | 1 | 1 | 1 | 0 | 1 | 1 | 1B |
| offset 14 | 1 | 0 | 0 | 1 | 1 | 0 | 0 | 1 | 1 | 1 | 0 | 1 | 1 | 0 | 0 | 1 | 1 | 0 | 1 | 1 | 1C |

Referring to the table and also to FIG. 4D, the 20% power level (which is for the minimum flicker parameter) is also the same for the high resolution technique. But in any case, the FIG. 4D relates to the 20% power level and thus for twenty cycles all cycles are on for the one-third of a half cycle, as indicated by the row of ones in Table 3.

Referring to the power level of 10%, here there is one-third of a half cycle for the first and second half cycles, the fifth and sixth and so on. Then, for the 11% power level, there is an added one-third of a half cycle at the half cycle "3". At 20% "1s" are present in all half cycles. Then, since this is the maximum for the "1" level when the 25% power level is reached, the two-thirds ("4") of a half cycle are utilized, as illustrated. And then for 50% level the full half cycle ("5") for both positive and negative is utilized. This is, in fact, identical to both the minimum flicker of Table 1 and the unity power factor of Table 2.

In the case of the 25% power level, adjustments have been made in the location of the "4" level waveform to shift it, for example, to the sixth half cycle rather than repeat it on the fifth. This provides again for balancing and minimizing flicker. At the same time the half cycle pointer technique with respect to the zones of Table 2 is also utilized. Because of the greater problem of flicker with a 1% or high resolution technique, Table 3 above also shows a technique for reducing flicker, for example, where a 12% power level is being applied to a zone. Here, as illustrated also in FIGS. 1A and 1B, the heat lamps of a particular zone are divided into subsidiary zones, namely, 1A, 1B and 1C, and then the data for the 12% zone is offset for each of the subzones; specifically, an offset of zero, 7 and 14, as illustrated. Thus, this reduces flicker.

Lastly, as briefly discussed, for start-up a low power level of "1," as illustrated in FIG. 4D, is utilized where a switch is actuated with respect to a zone every half cycle at a low power level. This is provided, as illustrated in FIG. 1, by the actuator computer 21, as shown by the start-up line 16 temporarily inserting in the scratch pad table the data relating to FIG. 4D until a warm-up occurs.

Thus, an improved power control system and method has been provided. By using full half cycles of the AC waveform cycles unity power factor with minimum ripple is achieved. Computing load is reduced since the associated microprocessor (see actuator computer 21) by treating all half cycles the same or one-sixth half cycle the same and by the means of the scratch pad table can execute by a zone pointer the desired control power levels. From a customer's standpoint, either at the plant or the customer's site, the power level lookup tables can be arranged to suit the customer's preference; for example, to provide only a high resolution technique or to allow changes to be made depending on the paper grade being manufactured at the time.

The present technique is an improvement over prior SCR uses since a general power level is maintained while still changing the power applied to a zone every half cycle (if necessary to implement one of the parameters of unity power factor, etc.). In contrast, a typical SCR system repeats every cycle or half cycle.

The provision of synchronization by the use of the already present three-phase voltages greatly simplifies timing. Sets of heating elements can be individually controlled in subsets, as discussed, to minimize flicker even more so. Finally, the wiring is greatly simplified due to the locating of the power switches at each zone.

I claim:

1. A control system for applying AC line power for drying a moving web where a plurality of side-by-side heat lamps are suspended over the web in a cross direction, each lamp or group of lamps relating to a particular zone or slice of the web comprising:

a power switch for said heat lamps of each said zone for turning AC power on and off in response to a control signal;

means for generating successive said control signals for each zone in a repeating pattern covering multiple AC half cycles and where said pattern is synchronized to said AC line power;

said generating means including means for changing power applied to a zone every half cycle, while the average of the power applied over the entire pattern is maintained at a predetermined power level.

2. A control system as in claim 1 where said pattern produces AC half cycles that are completely on or completely off.

3. A control system as in claim 1 where the AC line power is three-phase and said pattern produces AC half cycles that are completely on, two-thirds on, one-third on, or completely off.

4. A power control system with a three-phase AC line input for drying a moving web in response to a moisture controller where a plurality of side-by-side heat lamps are suspended over the web in a cross direction, each lamp or group of lamps relating to a particular zone or slice of the web comprising:

a power circuit extending across said web with each zone tapped off in parallel to power said heat lamps for each zone, including individual switching means for each zone located substantially at said zone for controlling the application of said power to said heat lamps;

processing means responsive to said moisture controller and the zero crossings of said three-phase AC line input for actuating said switching means for controlling half cycles or partial half cycles of said three-phase AC line input to the required power level as determined by said moisture controller.

5. A power control system as in claim 4 where said processing means include scratch pad memory means for storing data for said half cycles or partial half cycles for each zone, said data being dependent on predetermined parameters to provide either minimum flicker, unity power factor or high resolution power control.

6. A power control process for drying a moving web in response to a moisture controller where a plurality of side-by-side heat lamps are suspended over the web in a cross direction, each lamp or group of lamps relating to a particular zone or slice of the web, said process comprising the following steps:

connecting all of the heat lamps to an AC line voltage source in a particular zone by an individual switch related to said zone;

storing in a computer-type memory a predetermined plurality of power levels over a broad range from substantially 10% to 100%, each of said levels being related to a predetermined selection of data related to half cycles or partial half cycles of said line voltage, said data being selected to emphasize at least one of the following parameters: high power level resolution; unity power factor; and minimum flicker;

in response to commands from said moisture controller, transferring said stored power level data to a scratch pad memory table to provide the desired levels for each said zone, said scratch pad memory being responsive to a zone pointer;

driving said switches of said heat lamps with said data from said scratch pad memory table for providing for predetermined actuation of said switches to apply power to said heat lamps, said zone pointer locating said data for each zone.

7. A process as in claim 6 where said zone pointer sequences through all said zones at least each half cycle of said line voltage.

8. A process as in claim 7 where said sequencing is provided by interrupts which occur each one-sixth cycle of a three-phase line voltage input, said interrupts being provided by the zero crossings of each of the phases of said three-phase line voltage.

9. A process as in claim 6 where said unity power factor is achieved by using full half cycles selectively actuated over a predetermined plurality of cycles to provide said desired power levels.

10. A process as in claim 6 where said maximum resolution is provided by utilizing partial half cycles equal to one-sixth of a cycle and where timing is provided by zero crossings of a three-phase AC line input.

11. A process as in claim 6 where said minimum flicker is provided by repeating said data identically at least every two cycles of said AC line voltage.

12. A process as in claim 6 where for a cold start-up a low power level is used with the switches being actuated for a fraction of at least every other half cycle of AC line voltage.

* * * * *